United States Patent
Zhou et al.

(10) Patent No.: US 12,360,679 B2
(45) Date of Patent: Jul. 15, 2025

(54) MEMORY SYSTEM LOGICAL UNIT NUMBER PROCEDURES

(71) Applicant: Micron Technology, Inc., Boise, ID (US)

(72) Inventors: Zhou Zhou, Shanghai (CN); Li Xin Zhao, Shanghai (CN); Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 51 days.

(21) Appl. No.: 17/929,968

(22) Filed: Sep. 6, 2022

(65) Prior Publication Data

US 2024/0078022 A1    Mar. 7, 2024

(51) Int. Cl.
*G06F 3/06* (2006.01)

(52) U.S. Cl.
CPC ............ *G06F 3/0619* (2013.01); *G06F 3/064* (2013.01); *G06F 3/0659* (2013.01); *G06F 3/0673* (2013.01)

(58) Field of Classification Search
CPC ...... G06F 3/0619; G06F 3/064; G06F 3/0659; G06F 3/0673; G06F 3/061; G06F 3/0679; G06F 12/0804; G06F 3/0604; G06F 3/0646; G06F 12/0246

USPC ................................................. 711/154, 100
See application file for complete search history.

(56) References Cited

U.S. PATENT DOCUMENTS

| | | | | |
|---|---|---|---|---|
| 9,983,801 | B1* | 5/2018 | Karnowski | H04L 67/1097 |
| 2005/0228963 | A1* | 10/2005 | Rothman | G06F 3/064 |
| | | | | 711/170 |
| 2007/0168633 | A1* | 7/2007 | English | H04L 67/1097 |
| | | | | 707/E17.005 |
| 2015/0220550 | A1* | 8/2015 | Duzly | G06F 16/00 |
| | | | | 707/693 |
| 2017/0337212 | A1* | 11/2017 | Hayasaka | G06F 16/182 |
| 2018/0032278 | A1* | 2/2018 | Hall | G06F 3/0608 |

* cited by examiner

*Primary Examiner* — Hosain T Alam
*Assistant Examiner* — Zubair Ahmed
(74) *Attorney, Agent, or Firm* — Holland & Hart LLP

(57) ABSTRACT

Methods, systems, and devices for memory system logical unit number (LUN) procedures are described. A memory system may receive an indication to convert a LUN for storing LBAs associated with an application from a first type to a second type, where the second type is associated with a higher performance defragmentation process than the first type. The memory system may perform defragmentation on data associated with the LUN based on converting the LUN to the second type. The memory system may determine whether the LBAs stored in the LUN are ordered based on the defragmentation, and the memory system may operate (e.g., execute) the application based on the LBAs being ordered.

24 Claims, 8 Drawing Sheets

MEMORY SYSTEM LOGICAL UNIT NUMBER PROCEDURES

FIELD OF TECHNOLOGY

The following relates to one or more systems for memory, including memory system logical unit number (LUN) procedures.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
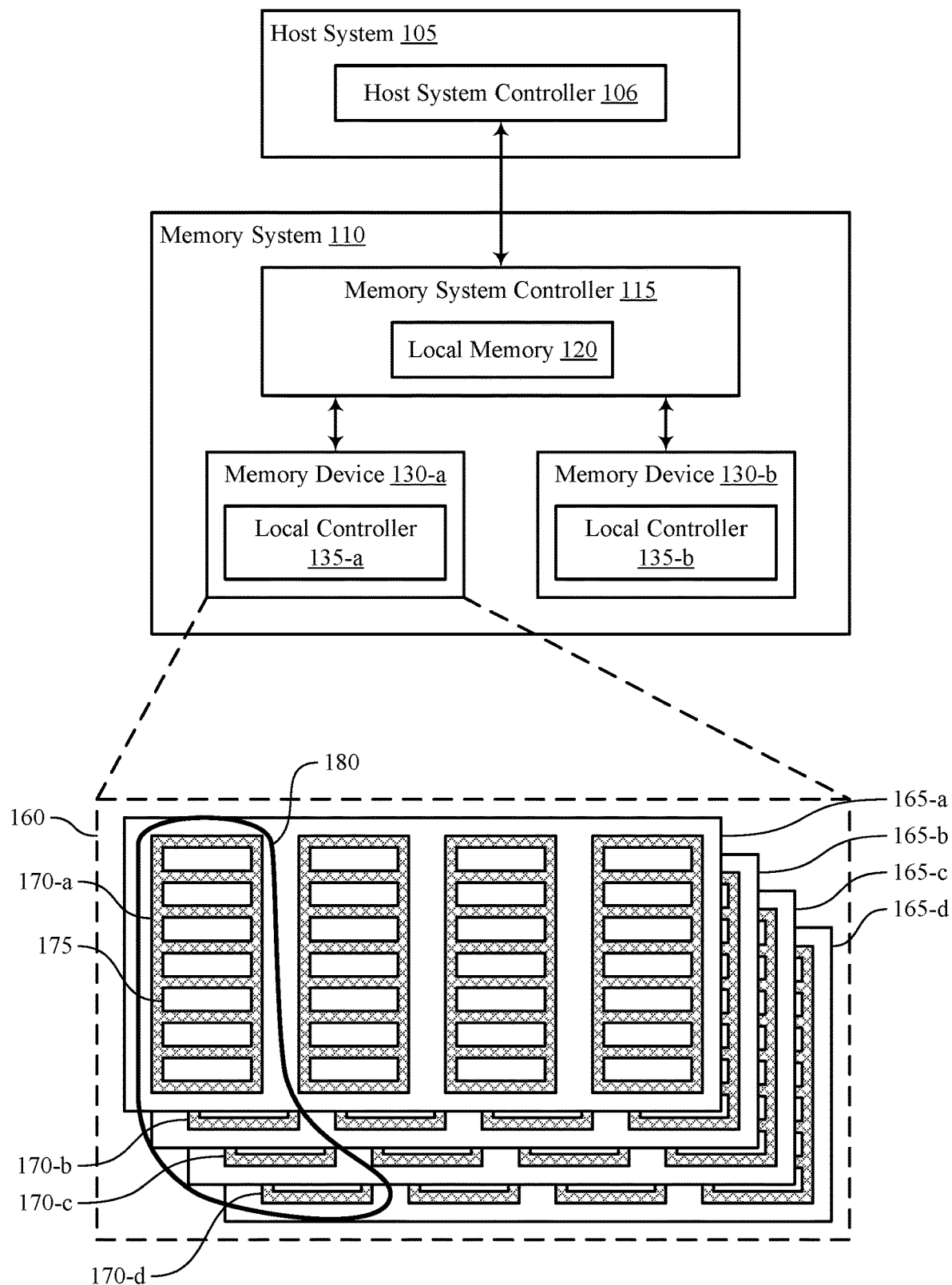
FIG. 1 illustrates an example of a system that supports memory system logical unit number (LUN) procedures in accordance with examples as disclosed herein.

A memory system may store data associated with an application. To enhance user experience, it may be desirable to improve performance of one or more specific applications on a device. However, the memory system may not be able to access logical block address (LBA) range information that corresponds to data associated with the one or more applications. Therefore, the memory system may not be able to manage the application information effectively, and may be unable to increase the performance of the one or more applications or the memory system itself. In some cases, if a host system sends LBA range information associated with the one or more applications to the memory system, the host system may also keep a copy of the LBA range information, which may result in multiple discrete LBA ranges, and if the one or more applications are updated or uninstalled both the host system and the memory system may be expected to update the LBA range information, which may result in additional overhead and unnecessary complexity. Additionally, or alternatively, the LBA range information of the one or more applications may be mixed with the LBA range information of one or more other, less significant applications, which may also increase overhead associated with accessing characteristics (e.g., the running status) of the application at the memory system.

A logical unit number (LUN) may be used to store LBA range information. In some examples, the host system may indicate for the memory system to convert a LUN from a first type (e.g., a standard LUN) to a second type (e.g., a smart LUN or an enhanced LUN). Based on converting the LUN to the second type, the memory system may perform a high performance defragmentation process associated with the second type and may determine whether the LBA range information stored in the LUN is ordered (e.g., in sequential order) based on the defragmentation. Based on the LBA range information being ordered, the memory system may operate the application (e.g., perform one or more operations to improve application performance). Data associated with LBAs stored in the second type of LUN may be or include data that is more frequently used or that is performance-critical data to the application. Implementing LUNs of the first type and the second type (e.g., different types) will provide a method for the memory system to increase performance of the application. For example, the second type of LUN may be associated with a higher performance defragmentation process than the first type of LUN. An improved defragmentation process for the second type of LUN will be associated with an increased performance of the application (e.g., an application stored in the second type of LUN). For example, the defragmentation process associated with the second type of LUN may increase application performance by increasing read performance. In some cases, the second type of LUN will be considered a high priority LUN and may be associated with other performance improvements.

Figure 2:
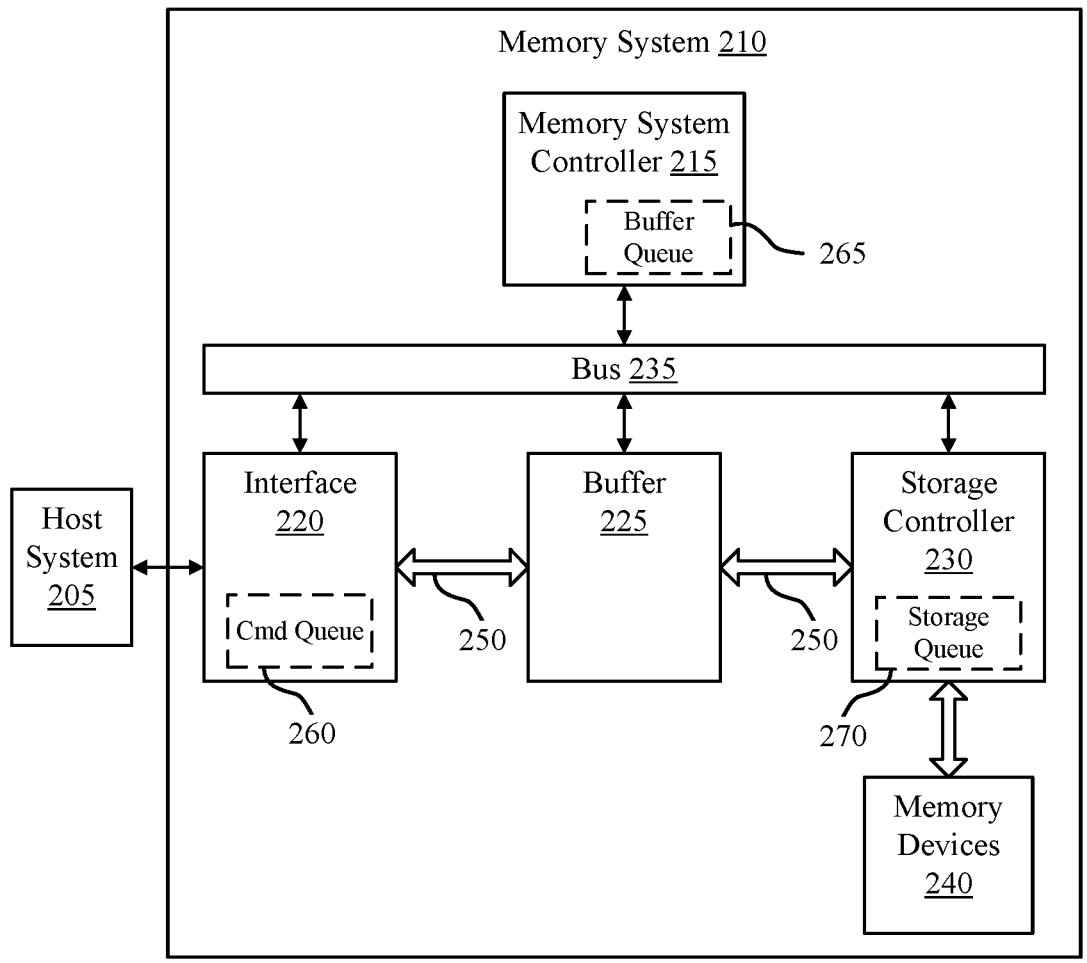
FIG. 2 illustrates an example of a system that supports memory system LUN procedures in accordance with examples as disclosed herein.

Features of the disclosure are initially described in the context of systems, devices, and circuits with reference to FIGS. 1 through 2. Features of the disclosure are described in the context of a process and a process flow with reference to FIGS. 3 through 4. These and other features of the disclosure are further illustrated by and described in the context of an apparatus diagram and flowchart that relate to memory system LUN procedures with reference to FIGS. 5 through 8.

FIG. 1 illustrates an example of a system 100 that supports memory system LUN procedures in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMN interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MHLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support memory system LUN procedures. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may store data associated with an application, and it may be desirable to improve performance of the application. However, the memory system 110 may not be able to access logical block address (LBA) range information that corresponds to the data associated with the application. Therefore, the memory system 110 may not be able to manage application information effectively and may not be able to increase the performance of the application as desired. In some cases, if the host system 105 sends LBA range information of the specific application to the memory system 110, the host system 105 may also keep a copy of the LBA range information, which may result in multiple discrete LBA ranges, and if the application is updated or uninstalled both the host system 105 and the memory system 110 may be expected to update the LBA range information, which may result in additional overhead, among other disadvantages. Additionally, or alternatively, the LBA range information of the application may be mixed with the LBA range information of one or more other less significant applications, which may increase overhead associated with accessing characteristics (e.g., the running status) of the application may increase overhead at the memory system 110.

A LUN may be used to store LBA range information. In some examples, the host system 105 may indicate for the memory system 110 to convert a LUN from a first type to a second type. Based on converting the LUN to the second type, the memory system 110 may perform a high performance defragmentation process associated with the second type and may determine whether the LBA range information stored in the LUN is ordered (e.g., in sequential order) based on the defragmentation. Based on the LBA range information being ordered, the memory system 110 may operate the application (e.g., perform one or more operations to improve application performance). Data associated with LBAs stored in the second type of LUN may be considered frequently used or performance-critical data to the application. Implementing LUNs of the first type and the second type will provide a method for the memory system 110 to increase performance of the application. For example, the second type of LUN may be associated with a higher performance defragmentation process than the first type of LUN, which will increase performance of the application (e.g., an application stored in the second type of LUN). For example, the defragmentation process associated with the second type of LUN will increase read performance associated with the application. In some cases, the second type of LUN may be considered a high priority LUN and may be associated with other performance improvements.

FIG. 2 illustrates an example of a system 200 that supports memory system LUN procedures in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on (e.g., in response to) the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory system 210 may store data associated with an application, and it may be desirable to improve performance of the application. However, the memory system 210 may not have access to LBA range information that corresponds to the data associated with the application. Therefore, the memory system 210 may not be able to manage application information effectively and may not be able to increase the performance of the application as desired. In some cases, if the host system 205 sends LBA range information of the application to the memory system 210, the host system 205 may also keep a copy of the LBA range information which may result in multiple discrete LBA ranges, and if the application is updated or uninstalled both the host system 205 and the memory system 210 may be expected to update the LBA range information, which may result in additional overhead, among other disadvantages. Additionally, or alternatively, the LBA range information of the application may be mixed with the LBA range information of one or more other less significant applications, which may increase overhead associated with accessing characteristics (e.g., the running status) of the application may increase overhead at the memory system 210.

A LUN may be used to store LBA range information. In some examples, the host system 205 may indicate the memory system 210 to convert a LUN from a first type to a second type. Based on converting the LUN to the second type, the memory system 210 may perform a high performance defragmentation process associated with the second type and may determine whether the LBA range information stored in the LUN is ordered (e.g., in sequential order) based on the defragmentation. Based on the LBA range information being ordered, the memory system 210 may operate the application (e.g., perform one or more operations to improve application performance). Data associated with LBAs stored in the second type of LUN may be considered frequently used or performance-critical data to the specific application. Implementing LUNs of the first type and the second type may provide a method for the memory system 210 to increase performance of the application. For example, the second type of LUN may be associated with a higher performance defragmentation process than the first type of LUN, which will increase performance of the application. For example, the defragmentation process associated with the second type of LUN may increase read performance associated with the application. In some cases, the second type of LUN may be considered a high priority LUN and may be associated with other performance improvements.

Figure 3:
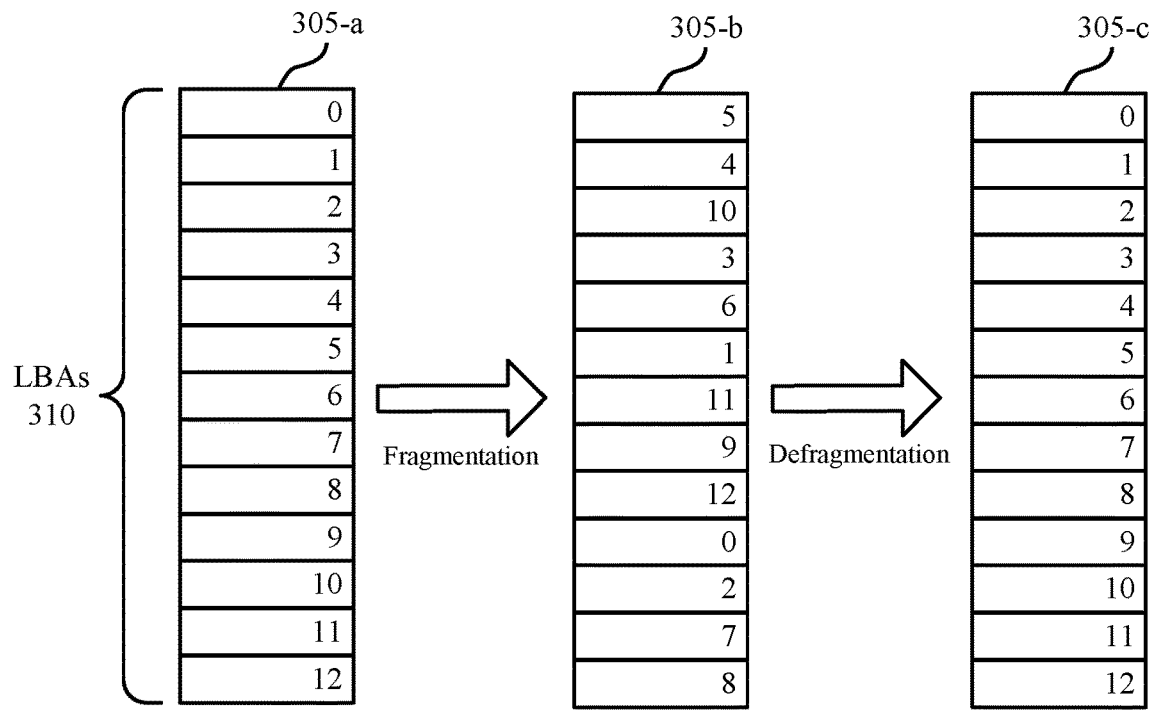
FIG. 3 illustrates an example of a process that supports memory system LUN procedures in accordance with examples as disclosed herein.
Figure 3:
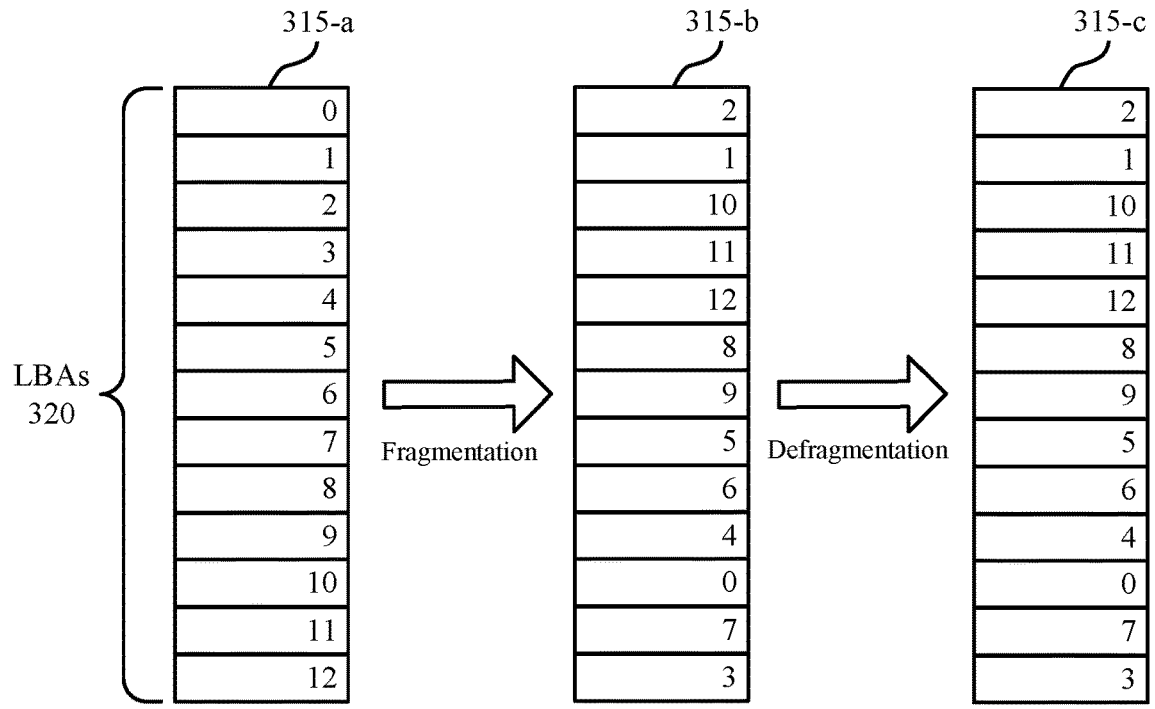

FIG. 3 illustrates an example of a process 300 that supports memory system LUN procedures in accordance with examples as disclosed herein. The memory system 110 may store data associated with an application. A memory system (e.g., memory system 110 or 210, as described with reference to FIGS. 1 and 2) may not be able to access LBA range information that corresponds to data associated with the application, which may affect the ability of the memory system to increase application performance. Additionally, or alternatively, the LBA range information of the application may be mixed with LBA range information of one or more other less significant applications, which may increase overhead associated with accessing characteristics of the application (among other disadvantages). A LUN may be used to store LBA range information. In some examples, a host system (e.g., host system 105 or 205, as described with reference to FIGS. 1 and 2) may indicate the memory system to convert a LUN associated with the application from a first type (e.g., a standard LUN) to a second type (e.g., an enhanced LUN). Implementing LUNs of the first type and the second type (e.g., LUNs of different types) may provide a method for the memory system to increase performance of the application (or multiple applications in some examples). For example, the second type of LUN may be associated with a higher performance defragmentation process, as shown in FIG. 3, than the first type of LUN, which will increase performance of an application associated with the second type of LUN.

Each LUN 305 and 315 may store a range of LBAs 310 and 320, respectively, and LBAs 310 or 320 may be associated with different applications. In some cases, a determination may be made (e.g., by a memory system, by a host system, by some combination of systems) to convert a LUN associated with a specific application (e.g., LUN 305) from the first type to the second type. For example, the host system may determine that the LUN 305 should be converted from the first type to the second type based on (e.g., in response to) data included in the LBAs 310 being associated with performance of an application (e.g., performance-critical application data). In some cases, a single LUN of multiple LUNs may be converted from the first type to the second type at a time (e.g., during a duration), and the host system may determine to convert the LUN 305 from the first type to the second type if the application associated with LBAs 310 is significant to device operations (e.g., is associated with an application that is categorized as a type of increased importance). For example, a user may specify that the application is significant (e.g., by indicating that an application should be categorized in a higher priority tier compared to other applications in a lower priority tier). In another example, the application may be associated with a performance of the device.

In some cases, the memory system may determine that the LUN 305 should be converted from the first type to the second type. For example, the memory system may receive an indication (e.g., a command) from the host system to convert the LUN 305 from the first type to the second type. In some cases, the decision to convert the LUN 305 to the second type may additionally, or alternatively be triggered by one or more conditions. For example, an indication from a user, performance critical data associated with LBAs 310, a performance mode of the application, a command, or any combination thereof may be examples of triggering conditions that may trigger a determination (e.g., by a memory system, by a host system) to convert the LUN 305 from the first type to the second type.

The LUN 315 may be the first type of LUN (e.g., a standard LUN) while the LUN 305 may be the second type of LUN (e.g., an enhanced or smart LUN) which may be associated with a higher performance defragmentation process than the LUN 315 of the first type. For example, the LBAs 310 of LUN 305-*a* may be in order (e.g., sequential order), but after fragmentation (e.g., due to host system input/output operations), the LBAs 310 of LUN 305-*b* may be fragmented (e.g., out of order), which may affect operations associated with the application associated with LBAs 310, such as read operations or other access operations.

Similarly, the LBAs 320 of LUN 315-*a* may be in order, but the LBAs 320 of LUN 315-*b* may be out of order (e.g., after fragmentation). However, the LBAs 310 of LUN 305-*c* may be in order while the LBAs 320 of LUN 315-*c* may be disordered based on (e.g., in response to) the defragmentation process associated with the second type of LUN being a higher performance defragmentation process (e.g., a smart defragmentation process) than the first type of LUN. For example, the first type of LUN may rely on an indication from the host system to specify the range of LBAs 320 which are to be defragmented, however with the second type of LUN the memory system may not depend on the host system to determine the range of LBAs 310 and thus may defragment the related LBAs 320 more effectively and efficiently.

The defragmentation process related to the second type of LUN may be associated with an automatic defragmentation or a decision to perform defragmentation. For example, the memory system may receive an indication associated with performing defragmentation on the LUN 305. In some cases, the memory system may determine whether to perform defragmentation on the LUN 305-*b* based on (e.g., in response to) the indication. In some cases, the indication may include a timing (e.g., a frequency) at which the memory system may perform defragmentation on the LUN 305, based on (e.g., in response to) the LUN 305 being the second type of LUN. For example, the host system may determine the timing at which defragmentation should be performed and may transmit an indication associated with or of the timing to the memory system. For example, the indication may include an explicit indication of the timing. In another example, the indication may include a value that the memory system may use to refer to a preconfigured timing, such as a table including a timing corresponding to the indicated value. In some cases, the indication may include one or more performance targets associated with the LUN 305, which the host system may determine. The performance targets may be based on (e.g., in response to) a percentage of maximum performance (e.g., of the memory system, of the application, of the device, or any combination thereof), a performance threshold (e.g., of the memory system, of the application, of the device, or any combination thereof), or any combination thereof. In some cases, one or more of the performance targets may be an expected performance target, and the memory device may perform a background defragmentation on the LUN 305-*b* (e.g., during idle time of the memory system) to maintain performance of the LUN 305 above the performance target (e.g., by avoiding performing foreground defragmentation that would otherwise reduce bandwidth of the system). In some cases, one or more of the performance targets may be a critical performance target (e.g., a performance target that should be met for device functionality), and the memory device may perform a foreground defragmentation if the performance of the LUN 305 is below the performance target. In some cases, the indication associated with performing defragmentation may be sent in advance (e.g., prior to conversion from the first type to the second type), and the memory system may perform optimization (e.g., defragmentation) of the LUN 305 without intervention from the host system (e.g., without further commands or indications from the host system).

In some cases, the memory system may transmit a fragmentation status of the LUN 305, for example, to the host system, and, for example, the host system may transmit the indication associated with performing defragmentation on the LUN 305 based on (e.g., in response to) the fragmentation status. For example, the host system may determine defragmentation should be performed on the LUN 305-*b* based on (e.g., in response to) the fragmentation status, and may transmit an indication such as a trigger to the memory system to perform defragmentation on the LUN 305-*b*.

The memory system may determine whether the LBAs 310 of LUN 305-*c* are in order after performing defragmentation. Based on (e.g., in response to) determining that the LBAs 310 of LUN 305-*c* are in order, the memory system may perform operations associated with the application. Additionally, or alternatively, the memory system may determine that the LBAs 310 of LUN 305-*c* are not in order, and may perform more defragmentation based on (e.g., in response to) the determination.

In some cases, the memory system may transmit a defragmentation report including defragmentation data associated with the defragmentation status of the LUN 305-*c*. For example, the defragmentation data may include whether defragmentation has been completed or how much defragmentation has been performed. In some examples, based on the defragmentation report, a host system (for example) may send an indication (e.g., command, instruction) to the memory system to perform defragmentation, continue defragmentation, cease defragmentation, perform other operations or actions, or any combination thereof.

The defragmentation process associated with the second type of LUN may be associated with a higher read performance and a higher application performance, among other differences and benefits. For example, the defragmentation process associated with the second type of LUN may result in the LBAs 310 of LUN 305-*c* being in order while the LBAs 320 of LUN 315-*c* may not be in order. The sequential order of LBAs 310 may increase the performance of the application associated with LUN 305, which may increase system efficiency along with user satisfaction, among other benefits.

Figure 4:
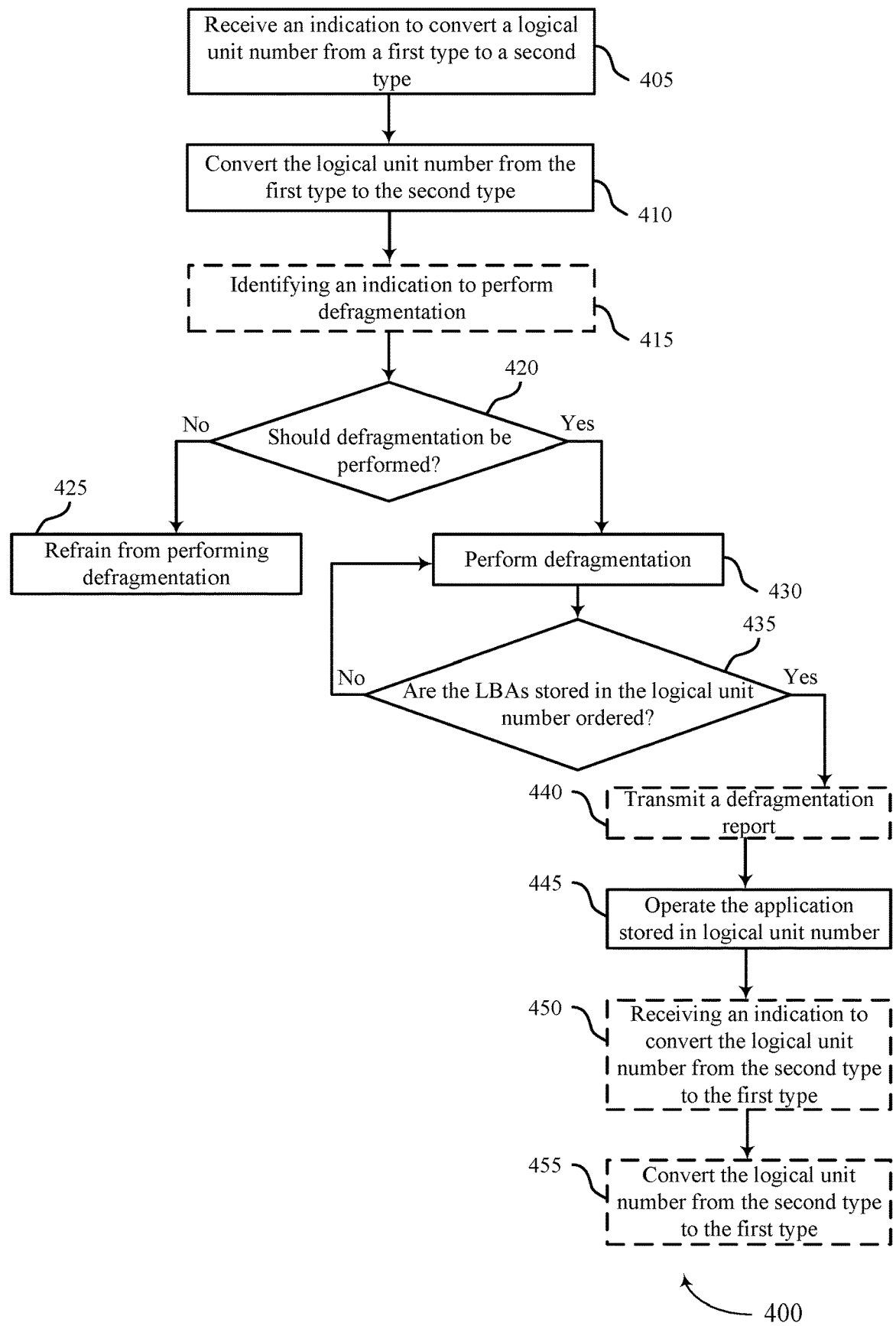
FIG. 4 illustrates an example of a process flow that supports memory system LUN procedures in accordance with examples as disclosed herein.

FIG. 4 illustrates an example of a process flow 400 that supports memory system LUN procedures in accordance with examples as disclosed herein. In some examples, process flow 400 may be implemented by one or more aspects of systems 100, or 200, or some combination. For instance, process flow 400 may be implemented by a memory system as described with reference to FIG. 1, or a memory system 210 as described with reference to FIG. 2, or some combination. The process flow 400 may correspond to one or more aspects of process 300 as described with reference to FIG. 3. Aspects of the process flow 400 may be implemented by a controller, among other components. Additionally, or alternatively, aspects of the process flow 400 may be implemented as instructions stored in memory (e.g., firmware stored in a memory coupled with a controller). For example, the instructions, in response to being executed by a controller (e.g., the memory system controller 115), may cause the controller to perform the operations of the process flow 400. In some cases, elements of the process flow 400 may be performed in a different order, and elements may be added to the process flow 400 or omitted from the process flow 400.

At 405, an indication to convert a LUN from a first type to a second type may be received. For example, the memory system receives (e.g., from the host system) the indication to convert a LUN (e.g., of a plurality of LUNs associated with the memory system) from a first type to a second type. In some cases, the second type of LUN may be associated with a specific data classification method. In some examples, the different types of data may include operating system data, firmware data, user data, control data, other types of data, or any combination thereof. For example, data corresponding to the first type of LUN may be a first type of data (e.g., operating system data, firmware data) and data corresponding to the second type of LUN may be a second type of data (e.g., user data). The LUN may be associated with a specific application. For example, the LUN may store or otherwise be associated with one or more LBAs associated with the application, and in some cases, the LBAs may be associated with critical application performance data. In some cases, the host system may indicate or define what is critical application performance data. For example, the host system may decrease the time required to access specific data (e.g., critical application performance data) by indicating the data to be stored in the second type of LUN. In some cases, the second type of LUN may have a maximum size limitation, which may increase performance (e.g., of the memory system, application, or a combination thereof) without a dramatically increased overhead of the memory system. The second type of LUN may be associated with a higher performance defragmentation process and therefore a higher application performance (e.g., after the higher performance defragmentation process is executed), as described with reference to FIG. 3, than the first type. Based on the ability of the memory system to access LBA range information specific to the application, improvements may be made to operating (e.g., executing) an application, which may also improve application performance. In some cases, the indication to convert the LUN to the second type may be based on (e.g., in response to) a significance of the data associated with the LBAs stored in the LUN, a significance of the application, a performance mode of the application, a user indication, or any combination thereof.

In some cases, the memory system may maintain a single LUN of the second type at a time, and therefore a single application may be associated with the second type of LUN at a time (e.g., during a given duration). For example, if the application is updated or uninstalled, the LBA range of the LUN may be affected and may increase overhead at the memory device. Alternatively, in some cases, the memory system may maintain multiple LUNs of the second type at a time, and therefore one or multiple applications may be associated with the second type of LUN at a time (e.g., during a given duration).

At 410, the LUN may be converted from the first type to the second type based on (e.g., in response to) the indication at 405. In some cases, the memory system may convert the LUN from the first type to the second type based on (e.g., in response to) the indication at 405. For example, the memory system may convert the LUN from the first type to the second type by setting a corresponding bit from a first state (e.g., bit 0 in the first type) to a second state (e.g., 1).

In some cases, at 415, an indication to perform defragmentation may be identified. For example, the memory system may identify the indication to perform defragmentation. In some cases, the indication may be related to a timing indicated by the host system, one or more performance targets, or an explicit indication to perform defragmentation transmitted by the host system, or any combination thereof. For example, the indication may include one or more performance targets for the memory system to monitor. If the memory system determines that the one or more performance targets are not met, the memory system may perform defragmentation.

At 420, a determination about whether defragmentation should be performed is made. In some cases, the memory system may determine whether defragmentation should be performed. In some cases, the determination may be based on (e.g., in response to) if the LBAs associated with the LUN are in sequential order or not. In some cases, the determination may be based on (e.g., in response to) a defragmentation timing. In some cases, the host system may indicate the defragmentation timing to the memory system (e.g., in the indication identified at 415). For example, if a specific duration has elapsed after conversion or a previous defragmentation (or other trigger point), the memory device may determine that defragmentation should be performed. Alternatively, if the specific amount of time has not elapsed, the memory device may determine that defragmentation should not be performed. The defragmentation timing may be hourly, daily, or weekly, or any other time frame. Performing defragmentation based on (e.g., in response to) defragmentation timing may allow the memory system to perform defragmentation without host system intervention, which will increase application performance, among other benefits.

In some cases, the determination may be based on (e.g., in response to) one or more performance targets. The performance targets may be based on (e.g., in response to) a percentage of maximum performance (e.g., of the memory system, of the application, of the device, or any combination thereof), a performance threshold (e.g., of the memory system, of the application, of the device, or any combination thereof), or any combination thereof. The host system may determine the one or more performance targets and indicate the performance targets to the memory system (e.g., at conversion of the LUN, with an indication associated with conversion of the LUN, before conversion of the LUN, after conversion of the LUN). In some examples, the one or more performance targets may include an expected performance target (e.g., of the memory system, of the application, of the device, or any combination thereof), and the memory system may perform a background defragmentation on the LUN to maintain performance above the expected performance target. For example, during idle time at the memory system the memory system may determine that the performance is below the expected performance target and may determine to perform defragmentation. In some examples, the one or more performance targets may include a critical performance target (e.g., of the memory system, of the application, of the device, or any combination thereof), and the memory system may perform a foreground defragmentation if the performance is below the critical performance target. For example, if the performance is below the critical performance target, the memory system may automatically determine to perform defragmentation. Alternatively, the memory device may determine that the one or more performance targets are met, and may determine that defragmentation should not be performed based on the one or more performance targets being met. The one or more performance targets may allow the memory system to perform defragmentation without host system intervention, which may increase application performance.

In some cases, the memory system may provide a fragmentation status to the host system. For example, the memory system may transmit an indication related to whether the LBAs stored in the LUN are in sequential order, and based on (e.g., in response to) the indication the host system may determine whether defragmentation should be performed. For example, the memory system may indicate that the LBAs are in a sequential order, and the host system may determine that defragmentation should not be performed. Alternatively, the memory system may indicate that the LBAs are not in sequential order, and the host system may determine that defragmentation should be performed and may transmit an indication or trigger to the memory system to perform defragmentation.

At 425, if it is determined not to perform defragmentation, then no defragmentation may be performed. In some cases, if the memory system determines not to perform defragmentation, the memory system may refrain from performing defragmentation.

Alternatively, at 430, if it is determined to perform defragmentation, then defragmentation may be performed. In some cases, if the memory system determines to perform defragmentation, then the memory system may perform defragmentation on data associated with the LUN.

At 435, it may be determined whether the LBAs stored in the LUN are ordered (e.g., sequential order). In some cases, the memory system may determine whether the LBAs stored in the LUN are ordered. In some cases, the memory system may determine that the LBAs stored in the LUN are not ordered (e.g., not in sequential order), and the memory device may perform defragmentation at 430. In other cases, the memory system may determine that the LBAs store in the LUN are ordered (e.g., in sequential order) based on (e.g., in response to) the defragmentation.

In some cases, based on (e.g., in response to) determining that the LBAs are ordered, at 440 a defragmentation report may be transmitted. For example, the memory system may transmit the defragmentation report to the host system. The defragmentation report may include data associated with the defragmentation status of the LUN. For example, the defragmentation data may include whether defragmentation has been completed or how much defragmentation has been performed. In some examples, based on the defragmentation report, the host system (for example) may send an indication (e.g., command, instruction) to the memory system to perform defragmentation, cease defragmentation, perform other operations or actions, or any combination thereof.

At 445, the application stored in the LUN may be operated. For example, the memory system may operate (e.g., execute) the application stored in the LUN based on (e.g., in response to) the LBAs stored in the LUN being ordered.

In some cases, at 450, an indication to convert the LUN from the second type to the first type may be received. For example, the memory system may receive an indication to convert the LUN from the second type to the first type from the host system. For example, the host system may be able to enable or disable features associated with the second type of LUN, and may determine the LUN should be converted from the second type to the first type. For example, the host system may determine another LUN associated with a different application should be converted to the second type. In another example, the host system may determine that the second type is no longer beneficial to a specific application. However, the host system may later determine to convert the LUN once again from the first type to the second type.

In some cases, at 455, based on (e.g., in response to) the indication at 450, the memory system may convert the LUN from the second type to the first type.

Figure 5:
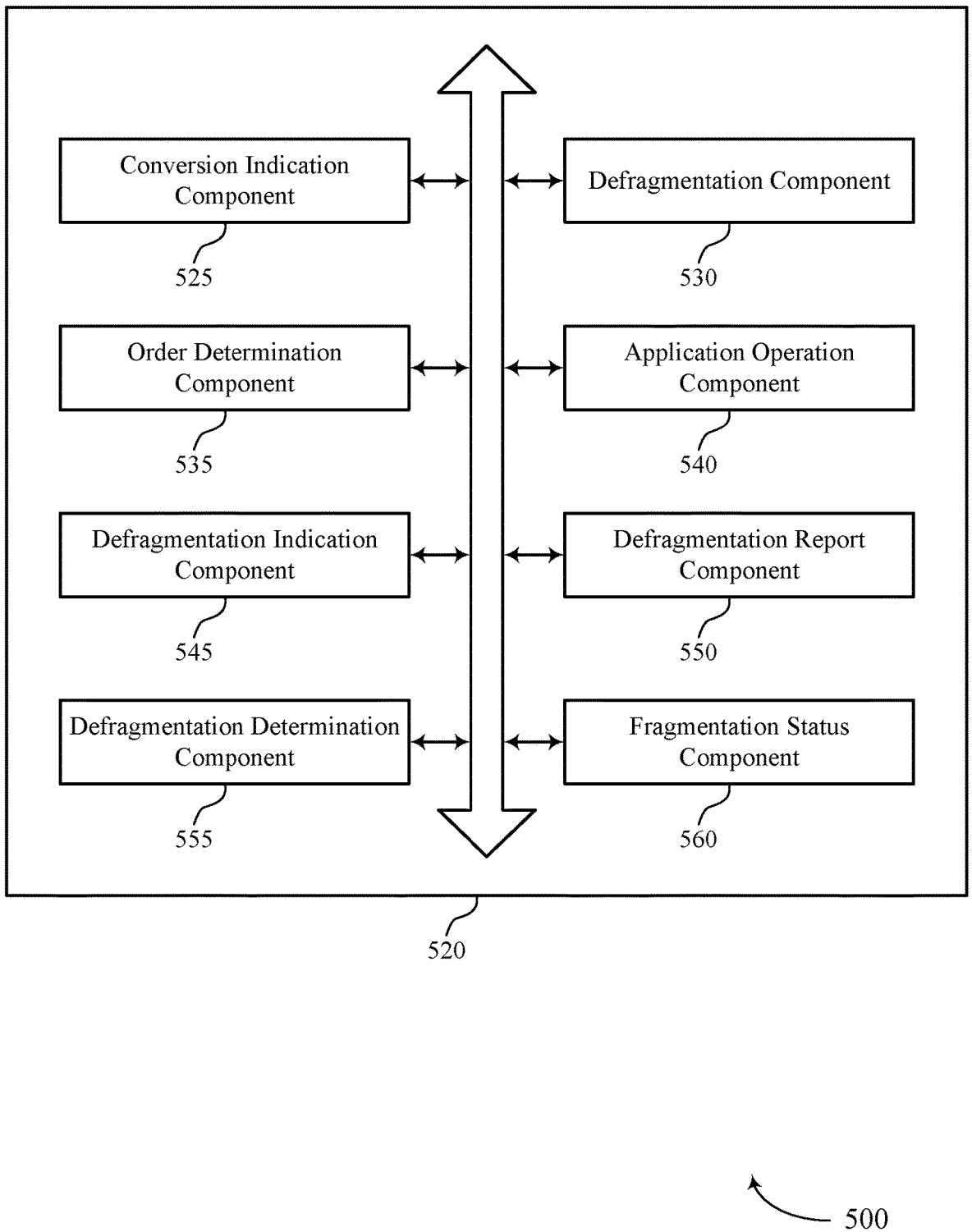
FIG. 5 shows a block diagram of a memory system that supports memory system LUN procedures in accordance with examples as disclosed herein.

FIG. 5 shows a block diagram 500 of a memory system 520 that supports memory system LUN procedures in accordance with examples as disclosed herein. The memory system 520 may be an example of aspects of a memory system as described with reference to FIGS. 1 through 4. The memory system 520, or various components thereof, may be an example of means for performing various aspects of memory system LUN procedures as described herein. For example, the memory system 520 may include a conversion indication component 525, a defragmentation component 530, an order determination component 535, an application operation component 540, a defragmentation indication component 545, a defragmentation report component 550, a defragmentation determination component 555, a fragmentation status component 560, or any combination thereof. Each of these components may communicate, directly or indirectly, with one another (e.g., via one or more buses).

The conversion indication component 525 may be configured as or otherwise support a means for receiving, at a memory system, an indication to convert a LUN for storing one or more logical block addresses associated with an application from a first type to a second type, the second type being associated with a higher performance defragmentation process than the first type. The defragmentation component 530 may be configured as or otherwise support a means for performing defragmentation on data associated with the LUN based at least in part on converting the LUN to the second type. The order determination component 535 may be configured as or otherwise support a means for determining whether the logical block addresses stored in the LUN are ordered based at least in part on the defragmentation. The application operation component 540 may be configured as or otherwise support a means for operating the application at the memory system based at least in part on the logical block addresses stored in the LUN being ordered.

In some examples, the defragmentation indication component 545 may be configured as or otherwise support a means for receiving, at the memory system, an indication associated with performing defragmentation at the memory system based at least in part on converting the LUN to the second type.

In some examples, the defragmentation determination component 555 may be configured as or otherwise support a means for determining whether to perform the defragmentation on the data associated with the LUN based at least in part on the indication of defragmentation, where performing defragmentation on data associated with the LUN is based at least in part on determining to perform the defragmentation.

In some examples, the indication of defragmentation includes a timing at which defragmentation will be performed at the memory system.

In some examples, the indication of defragmentation includes one or more performance targets for the memory system associated with defragmentation being performed at the memory system.

In some examples, performing the defragmentation on the data associated with the LUN includes performing a background defragmentation during an idle time based at least in part on the one or more performance targets.

In some examples, performing the defragmentation on the data associated with the LUN includes performing a foreground defragmentation based at least in part on the one or more performance targets.

In some examples, the fragmentation status component 560 may be configured as or otherwise support a means for transmitting, at the memory system, a fragmentation status of the LUN, where the indication of defragmentation is based at least in part on the fragmentation status.

In some examples, to support receiving the indication to convert the LUN from the first type to the second type, the conversion indication component 525 may be configured as or otherwise support a means for receiving a command including the indication.

In some examples, the conversion indication component 525 may be configured as or otherwise support a means for receiving an indication to convert the LUN from the second type to the first type.

In some examples, the defragmentation report component 550 may be configured as or otherwise support a means for transmitting a defragmentation report including defragmentation data associated with the LUN based at least in part on a defragmentation status of the data associated with the LUN.

In some examples, receiving the indication to convert the LUN from the first type to the second type is based at least in part on data included in the logical block addresses being associated with performance of the application.

In some examples, the second type is associated with a higher read performance and a higher application performance than the first type.

Figure 6:
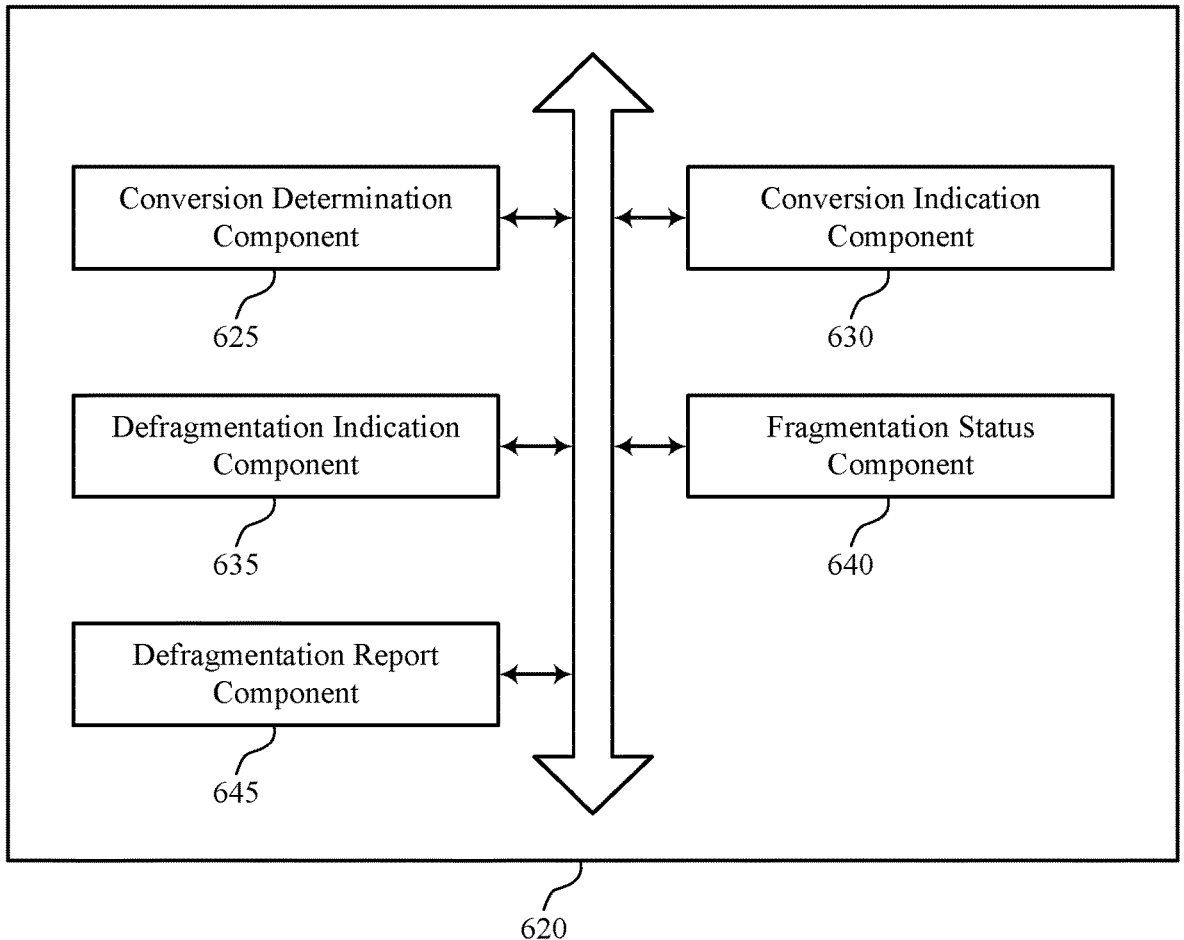
FIG. 6 shows a block diagram of a host system that supports memory system LUN procedures in accordance with examples as disclosed herein.

FIG. 6 shows a block diagram 600 of a host system 620 that supports memory system LUN procedures in accordance with examples as disclosed herein. The host system 620 may be an example of aspects of a host system as described with reference to FIGS. 1 through 4. The host system 620, or various components thereof, may be an example of means for performing various aspects of memory system LUN procedures as described herein. For example, the host system 620 may include a conversion determination component 625, a conversion indication component 630, a defragmentation indication component 635, a fragmentation status component 640, a defragmentation report component 645, or any combination thereof. Each of these components may communicate, directly or indirectly, with one another (e.g., via one or more buses).

The conversion determination component 625 may be configured as or otherwise support a means for determining, at a host system, whether to convert a LUN for storing one or more logical block addresses associated with an application from a first type to a second type, the second type being associated with a higher performance defragmentation process than the first type. The conversion indication component 630 may be configured as or otherwise support a means for transmitting an indication to convert the LUN from the first type to the second type based at least in part on determining to convert the LUN. The defragmentation indication component 635 may be configured as or otherwise support a means for transmitting an indication of defragmentation based at least in part on the indication to convert the LUN from the first type to the second type.

In some examples, the LUN is a single LUN of a plurality of LUNs. In some examples, transmitting the indication to convert the LUN from the first type to the second type is based at least in part on the LUN being the single LUN of the plurality of LUNs.

In some examples, the indication of defragmentation includes a timing at which defragmentation will be performed.

In some examples, the indication of defragmentation includes one or more performance targets for a memory system associated with defragmentation being performed at the memory system.

In some examples, the fragmentation status component 640 may be configured as or otherwise support a means for receiving, at the host system, a fragmentation status of the LUN, where the indication of defragmentation is based at least in part on the fragmentation status.

In some examples, to support transmitting the indication to convert the LUN from the first type to the second type, the conversion indication component 630 may be configured as or otherwise support a means for transmitting a command including the indication.

In some examples, the conversion determination component 625 may be configured as or otherwise support a means for determining whether to convert the LUN from the second type to the first type. In some examples, the conversion indication component 630 may be configured as or otherwise support a means for transmitting an indication to convert the LUN from the second type to the first type based at least in part on determining to convert the LUN.

In some examples, the defragmentation report component 645 may be configured as or otherwise support a means for receiving a defragmentation report including defragmentation data associated with the LUN based at least in part on a defragmentation status of data associated with the LUN.

In some examples, determining whether to convert the LUN from the first type to the second type is based at least in part on data included in the logical block addresses being associated with performance of the application.

In some examples, the second type is associated with a higher read performance and a higher application performance than the first type.

Figure 7:
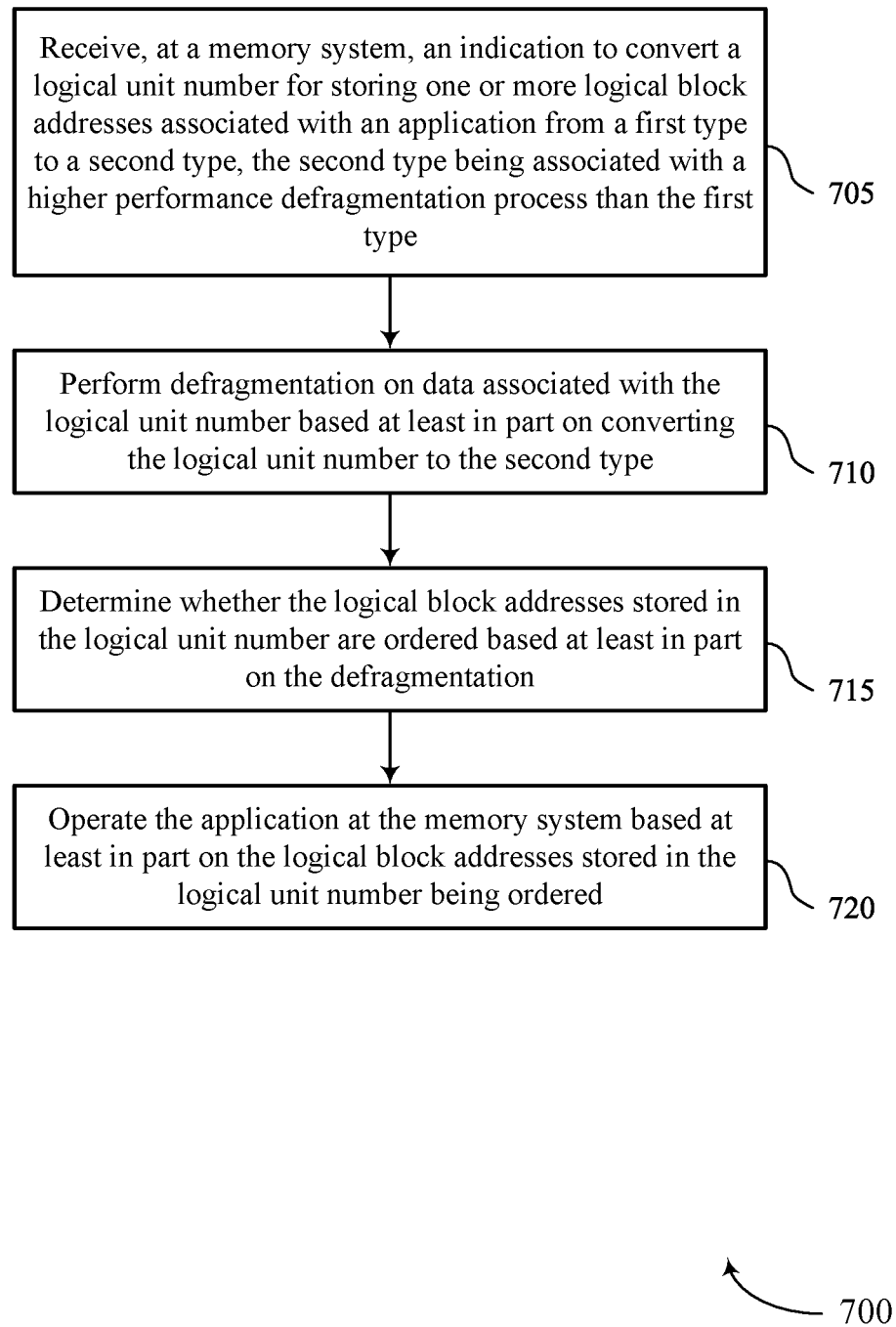
FIGS. 7 and 8 show flowcharts illustrating a method or methods that support memory system LUN procedures in accordance with examples as disclosed herein.

FIG. 7 shows a flowchart illustrating a method 700 that supports memory system LUN procedures in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 705, the method may include receiving, at a memory system, an indication to convert a LUN for storing one or more logical block addresses associated with an application from a first type to a second type, the second type being associated with a higher performance defragmentation process than the first type. The operations of 705 may be performed in accordance with examples as disclosed herein. In some examples, aspects of the operations of 705 may be performed by a conversion indication component 525 as described with reference to FIG. 5.

At 710, the method may include performing defragmentation on data associated with the LUN based at least in part on converting the LUN to the second type. The operations of 710 may be performed in accordance with examples as disclosed herein. In some examples, aspects of the operations of 710 may be performed by a defragmentation component 530 as described with reference to FIG. 5.

At 715, the method may include determining whether the logical block addresses stored in the LUN are ordered based at least in part on the defragmentation. The operations of 715 may be performed in accordance with examples as disclosed herein. In some examples, aspects of the operations of 715 may be performed by an order determination component 535 as described with reference to FIG. 5.

At 720, the method may include operating the application at the memory system based at least in part on the logical block addresses stored in the LUN being ordered. The operations of 720 may be performed in accordance with examples as disclosed herein. In some examples, aspects of the operations of 720 may be performed by an application operation component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at a memory system, an indication to convert a LUN for storing one or more logical block addresses associated with an application from a first type to a second type, the second type being associated with a higher performance defragmentation process than the first type; performing defragmentation on data associated with the LUN based at least in part on converting the LUN to the second type; determining whether the logical block addresses stored in the LUN are ordered based at least in part on the defragmentation; and operating the application at the memory system based at least in part on the logical block addresses stored in the LUN being ordered.

Aspect 2: The method, apparatus, or non-transitory computer-readable medium of aspect 1, further including operations, features, circuitry, logic, means, or instructions, or any combination thereof for receiving, at the memory system, an indication associated with performing defragmentation at the memory system based at least in part on converting the LUN to the second type.

Aspect 3: The method, apparatus, or non-transitory computer-readable medium of aspect 2, further including operations, features, circuitry, logic, means, or instructions, or any combination thereof for determining whether to perform the defragmentation on the data associated with the LUN based at least in part on the indication of defragmentation, where performing defragmentation on data associated with the LUN is based at least in part on determining to perform the defragmentation.

Aspect 4: The method, apparatus, or non-transitory computer-readable medium of any of aspects 2 through 3, where the indication of defragmentation includes a timing at which defragmentation will be performed at the memory system.

Aspect 5: The method, apparatus, or non-transitory computer-readable medium of any of aspects 2 through 4, where the indication of defragmentation includes one or more performance targets for the memory system associated with defragmentation being performed at the memory system.

Aspect 6: The method, apparatus, or non-transitory computer-readable medium of aspect 5, where performing the defragmentation on the data associated with the LUN includes performing a background defragmentation during an idle time based at least in part on the one or more performance targets.

Aspect 7: The method, apparatus, or non-transitory computer-readable medium of any of aspects 5 through 6, where performing the defragmentation on the data associated with the LUN includes performing a foreground defragmentation based at least in part on the one or more performance targets.

Aspect 8: The method, apparatus, or non-transitory computer-readable medium of any of aspects 2 through 7, further including operations, features, circuitry, logic, means, or instructions, or any combination thereof for transmitting, at the memory system, a fragmentation status of the LUN, where the indication of defragmentation is based at least in part on the fragmentation status.

Aspect 9: The method, apparatus, or non-transitory computer-readable medium of any of aspects 1 through 8, where receiving the indication to convert the LUN from the first type to the second type further includes operations, features, circuitry, logic, means, or instructions, or any combination thereof for receiving a command including the indication.

Aspect 10: The method, apparatus, or non-transitory computer-readable medium of any of aspects 1 through 9, further including operations, features, circuitry, logic, means, or instructions, or any combination thereof for receiving an indication to convert the LUN from the second type to the first type.

Aspect 11: The method, apparatus, or non-transitory computer-readable medium of any of aspects 1 through 10, further including operations, features, circuitry, logic, means, or instructions, or any combination thereof for transmitting a defragmentation report including defragmentation data associated with the LUN based at least in part on a defragmentation status of the data associated with the LUN.

Aspect 12: The method, apparatus, or non-transitory computer-readable medium of any of aspects 1 through 11, where receiving the indication to convert the LUN from the first type to the second type is based at least in part on data included in the logical block addresses being associated with performance of the application.

Aspect 13: The method, apparatus, or non-transitory computer-readable medium of any of aspects 1 through 12, where the second type is associated with a higher read performance and a higher application performance than the first type.

Figure 8:
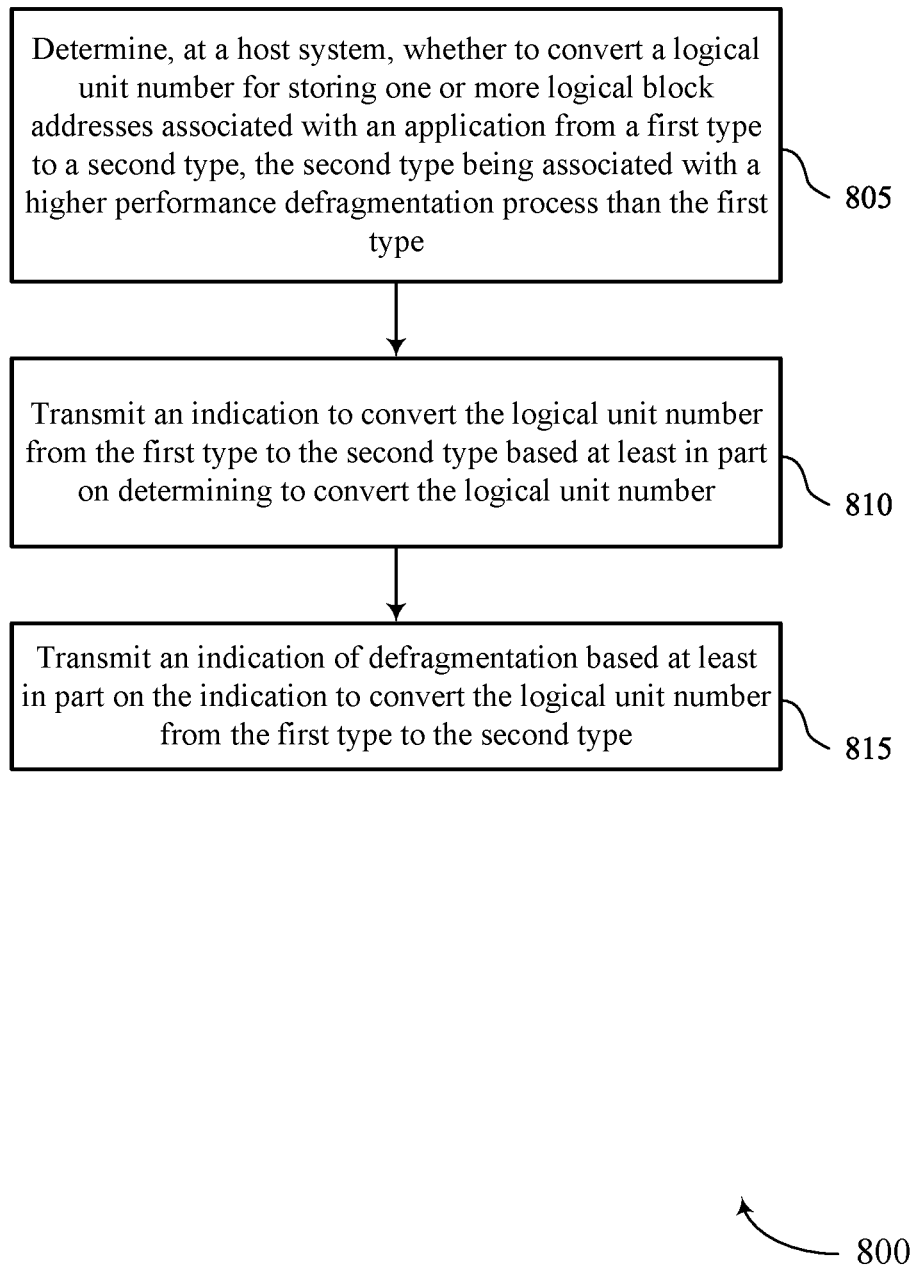

FIG. 8 shows a flowchart illustrating a method 800 that supports memory system LUN procedures in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally, or alternatively, the host system may perform aspects of the described functions using special-purpose hardware.

At 805, the method may include determining, at a host system, whether to convert a LUN for storing one or more logical block addresses associated with an application from a first type to a second type, the second type being associated with a higher performance defragmentation process than the first type. The operations of 805 may be performed in accordance with examples as disclosed herein. In some examples, aspects of the operations of 805 may be performed by a conversion determination component 625 as described with reference to FIG. 6.

At 810, the method may include transmitting an indication to convert the LUN from the first type to the second type based at least in part on determining to convert the LUN. The operations of 810 may be performed in accordance with examples as disclosed herein. In some examples, aspects of the operations of 810 may be performed by a conversion indication component 630 as described with reference to FIG. 6.

At 815, the method may include transmitting an indication of defragmentation based at least in part on the indication to convert the LUN from the first type to the second type. The operations of 815 may be performed in accordance with examples as disclosed herein. In some examples, aspects of the operations of 815 may be performed by a defragmentation indication component 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 14: A method, apparatus, or non-transitory computer-readable medium including operations, features, circuitry, logic, means, or instructions, or any combination thereof for determining, at a host system, whether to convert a LUN for storing one or more logical block addresses associated with an application from a first type to a second type, the second type being associated with a higher performance defragmentation process than the first type; transmitting an indication to convert the LUN from the first type to the second type based at least in part on determining to convert the LUN; and transmitting an indication of defragmentation based at least in part on the indication to convert the LUN from the first type to the second type.

Aspect 15: The method, apparatus, or non-transitory computer-readable medium of aspect 14, where the LUN is a single LUN of a plurality of LUNs and transmitting the indication to convert the LUN from the first type to the second type is based on (e.g., in response to) the LUN being the single LUN of the plurality of LUNs.

Aspect 16: The method, apparatus, or non-transitory computer-readable medium of any of aspects 14 through 15, where the indication of defragmentation includes a timing at which defragmentation will be performed.

Aspect 17: The method, apparatus, or non-transitory computer-readable medium of any of aspects 14 through 16, where the indication of defragmentation includes one or more performance targets for a memory system associated with defragmentation being performed at the memory system.

Aspect 18: The method, apparatus, or non-transitory computer-readable medium of any of aspects 14 through 17, further including operations, features, circuitry, logic, means, or instructions, or any combination thereof for receiving, at the host system, a fragmentation status of the LUN, where the indication of defragmentation is based at least in part on the fragmentation status.

Aspect 19: The method, apparatus, or non-transitory computer-readable medium of any of aspects 14 through 18, where transmitting the indication to convert the LUN from the first type to the second type further includes operations, features, circuitry, logic, means, or instructions, or any combination thereof for transmitting a command including the indication.

Aspect 20: The method, apparatus, or non-transitory computer-readable medium of any of aspects 14 through 19, further including operations, features, circuitry, logic, means, or instructions, or any combination thereof for determining whether to convert the LUN from the second type to the first type and transmitting an indication to convert the LUN from the second type to the first type based at least in part on determining to convert the LUN.

Aspect 21: The method, apparatus, or non-transitory computer-readable medium of any of aspects 14 through 20, further including operations, features, circuitry, logic, means, or instructions, or any combination thereof for receiving a defragmentation report including defragmentation data associated with the LUN based at least in part on a defragmentation status of data associated with the LUN.

Aspect 22: The method, apparatus, or non-transitory computer-readable medium of any of aspects 14 through 21, where determining whether to convert the LUN from the first type to the second type is based at least in part on data included in the logical block addresses being associated with performance of the application.

Aspect 23: The method, apparatus, or non-transitory computer-readable medium of any of aspects 14 through 22, where the second type is associated with a higher read performance and a higher application performance than the first type.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
receive an indication to convert a logical unit number for storing one or more logical block addresses associated with an application from a first type of logical unit number associated with a first priority to a second type of logical unit number associated with a second priority, the second priority greater than the first priority, the second type being associated with a higher performance defragmentation process than the first type;
set, based at least in part on receiving the indication, one or more bits that indicate a type of the logical unit number from a first state corresponding to the first type to a second state corresponding to the second type, wherein setting the one or more bits converts the logical unit number from the first type associated with the first priority to the second type associated with the second priority, and indicates that data associated with the one or more logical block addresses is performance-critical data of the application;
perform defragmentation on the data associated with the logical unit number according to a defragmentation frequency that is based at least in part on converting the logical unit number to the second type;
determine whether the one or more logical block addresses stored in the logical unit number are ordered based at least in part on the defragmentation; and
operate the application at the memory system based at least in part on the one or more logical block addresses stored in the logical unit number being ordered.

2. The memory system of claim 1, wherein the processing circuitry is further configured to cause the memory system to:
receive an indication associated with performing defragmentation in accordance with the higher performance defragmentation process at the memory system based at least in part on converting the logical unit number to the second type.

3. The memory system of claim 2, wherein the processing circuitry is further configured to cause the memory system to:
determine whether to perform the defragmentation on the data associated with the logical unit number based at least in part on the indication of defragmentation, wherein performing defragmentation on data associated with the logical unit number is based at least in part on determining to perform the defragmentation.

4. The memory system of claim 2, wherein the indication of defragmentation indicates the defragmentation frequency associated with a timing at which defragmentation will be performed at the memory system.

5. The memory system of claim 2, wherein the indication of defragmentation comprises one or more performance targets for the memory system associated with defragmentation being performed at the memory system.

6. The memory system of claim 5, wherein performing the defragmentation on the data associated with the logical unit number comprises performing a background defragmentation during an idle time based at least in part on the one or more performance targets.

7. The memory system of claim 5, wherein performing the defragmentation on the data associated with the logical unit number comprises performing a foreground defragmentation based at least in part on the one or more performance targets.

8. The memory system of claim 2, wherein the processing circuitry is further configured to cause the memory system to:
transmit a fragmentation status of the logical unit number, wherein the indication of defragmentation is based at least in part on the fragmentation status.

9. The memory system of claim 1, wherein to receive the indication to convert the logical unit number from the first type to the second type, the processing circuitry is configured to cause the memory system to:
receive a command comprising the indication.

10. The memory system of claim 1, wherein the processing circuitry is further configured to cause the memory system to:
  receive an indication to convert the logical unit number from the second type to the first type.

11. The memory system of claim 1, wherein the processing circuitry is further configured to cause the memory system to:
  transmit a defragmentation report comprising defragmentation data associated with the logical unit number based at least in part on a defragmentation status of the data associated with the logical unit number.

12. The memory system of claim 1, wherein receiving the indication to convert the logical unit number from the first type to the second type is based at least in part on data included in the one or more logical block addresses being associated with performance of the application.

13. The memory system of claim 1, wherein the second type is associated with a higher read performance and a higher application performance than the first type.

14. The memory system of claim 1, wherein the data comprises user data associated with the second priority, and wherein receiving the indication to convert the logical unit number from the first type to the second type is based at least in part on the data comprising the user data.

15. A host system, comprising:
  one or more interfaces operable for communications with one or more memory systems; and
  one or more controllers coupled with the one or more memory systems and configured to cause the host system to:
    determine whether to convert a logical unit number for storing one or more logical block addresses associated with an application from a first type of logical unit number associated with a first priority to a second type of logical unit number associated with a second priority, the second priority greater than the first priority, the second type being associated with a higher performance defragmentation process than the first type;
    transmit, based at least in part on determining to convert the logical unit number, an indication to convert the logical unit number from the first type to the second type based at least in part on a setting of one or more bits that indicate a type of logical unit number from a first state corresponding to the first type to a second state corresponding to the second type, and wherein the setting of the one or more bits converts the logical unit number from the first type associated with the first priority to the second type associated with the second priority, and indicates that data associated with the one or more logical block addresses is performance-critical data of the application; and
    transmit an indication of defragmentation based at least in part on the indication to convert the logical unit number from the first type to the second type, wherein the indication comprises a defragmentation frequency associated with a timing at which defragmentation will be performed.

16. The host system of claim 15, wherein the logical unit number is a single logical unit number of a plurality of logical unit numbers, and wherein transmitting the indication to convert the logical unit number from the first type to the second type is based at least in part on the logical unit number being a single logical unit number of the plurality of logical unit numbers.

17. The host system of claim 15, wherein the indication of defragmentation comprises one or more performance targets for a memory system associated with defragmentation being performed at the memory system.

18. The host system of claim 15, wherein the one or more controllers are further configured to cause the host system to:
  receive, at the host system, a fragmentation status of the logical unit number, wherein the indication of defragmentation is based at least in part on the fragmentation status.

19. The host system of claim 15, wherein to transmit the indication to convert the logical unit number from the first type to the second type, the one or more controllers are configured to cause the host system to:
  transmit a command comprising the indication.

20. The host system of claim 15, wherein the one or more controllers are further configured to cause the host system to:
  determine whether to convert the logical unit number from the second type to the first type; and
  transmit an indication to convert the logical unit number from the second type to the first type based at least in part on determining to convert the logical unit number.

21. The host system of claim 15, wherein the one or more controllers are further configured to cause the host system to:
  receive a defragmentation report comprising defragmentation data associated with the logical unit number based at least in part on a defragmentation status of data associated with the logical unit number.

22. The host system of claim 15, wherein determining whether to convert the logical unit number from the first type to the second type is based at least in part on data included in the one or more logical block addresses being associated with performance of the application.

23. The host system of claim 15, wherein the second type is associated with a higher read performance and a higher application performance than the first type.

24. A non-transitory computer-readable medium storing code comprising instructions which, when executed by processing circuitry of an electronic device, cause the electronic device to:
  receive, at a memory system, an indication to convert a logical unit number for storing one or more logical block addresses associated with an application from a first type of logical unit number associated with a first priority to a second type of logical unit number associated with a second priority, the second priority greater than the first priority, the second type being associated with a higher performance defragmentation process than the first type;
  set, based at least in part on receiving the indication, one or more bits associated with a type of the logical unit number from a first state corresponding to the first type to a second state associated with the second type, wherein setting the one or more bits converts to the logical unit number from the first type associated with the first priority to the second type associated with the second priority, and indicates that data associated with the one or more logical block addresses is performance-critical data of the application;
  perform defragmentation on the data associated with the logical unit number according to a defragmentation frequency that is based at least in part on converting the logical unit number to the second type;

determine whether the one or more logical block addresses stored in the logical unit number are ordered based at least in part on the defragmentation; and operate the application at the memory system based at least in part on the one or more logical block addresses stored in the logical unit number being ordered.

\* \* \* \* \*